US012646726B2

(12) United States Patent
Prince et al.

(10) Patent No.: US 12,646,726 B2
(45) Date of Patent: Jun. 2, 2026

(54) SYSTEM AND METHOD FOR COOLING A FUEL CELL ASSEMBLY

(71) Applicant: LIEBHERR-AEROSPACE TOULOUSE SAS, Toulouse (FR)

(72) Inventors: Karin Prince, Toulouse (FR); David Lavergne, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 564 days.

(21) Appl. No.: 18/033,799

(22) PCT Filed: Oct. 25, 2021

(86) PCT No.: PCT/EP2021/079573
§ 371 (c)(1),
(2) Date: Apr. 25, 2023

(87) PCT Pub. No.: WO2022/090173
PCT Pub. Date: May 5, 2022

(65) Prior Publication Data
US 2023/0402625 A1 Dec. 14, 2023

(30) Foreign Application Priority Data

Oct. 26, 2020 (FR) ..................................... 2010966

(51) Int. Cl.
*H01M 8/04029* (2016.01)
*H01M 8/04701* (2016.01)
*H01M 8/249* (2016.01)

(52) U.S. Cl.
CPC ... *H01M 8/04029* (2013.01); *H01M 8/04731* (2013.01); *H01M 8/249* (2013.01); *H01M 2250/20* (2013.01)

(58) Field of Classification Search
CPC ......... H01M 8/04029; H01M 8/04731; H01M 8/249; H01M 2250/20
See application file for complete search history.

(56) References Cited

U.S. PATENT DOCUMENTS

| | | | |
|---|---|---|---|
| 2003/0064262 A1* | 4/2003 | Ballantine | ......... H01M 8/04753 429/442 |
| 2004/0108148 A1* | 6/2004 | Vanderwees | ............ B60L 58/33 180/68.1 |
| 2012/0160581 A1* | 6/2012 | Hoess | ................ B60H 1/00207 180/68.1 |

* cited by examiner

*Primary Examiner* — Stewart A Fraser
(74) *Attorney, Agent, or Firm* — CRGO Global; Steven M. Greenberg

(57) ABSTRACT

The invention relates to a system for cooling a fuel cell assembly (10) of a transport vehicle, such as an aircraft, comprising: a cooling fluid circulation loop (20); a cooling heat exchanger (24) configured to be able to provide heat exchanges between said loop (20) and a channel (25) for circulating cooling air (26); a variable-speed pump (21) for supplying said cooling loop with cooling fluid as a function of a measurement representative of the cooling need of said fuel cell assembly; for each fuel cell (10a, 10b, 10c) of said cell assembly, a 3-way valve (12a, 12b, 12c) for regulating the flow rate of cooling fluid supplying this cell as a function of a measurement representative of the cooling need of this cell.

9 Claims, 1 Drawing Sheet

[Fig. 1]
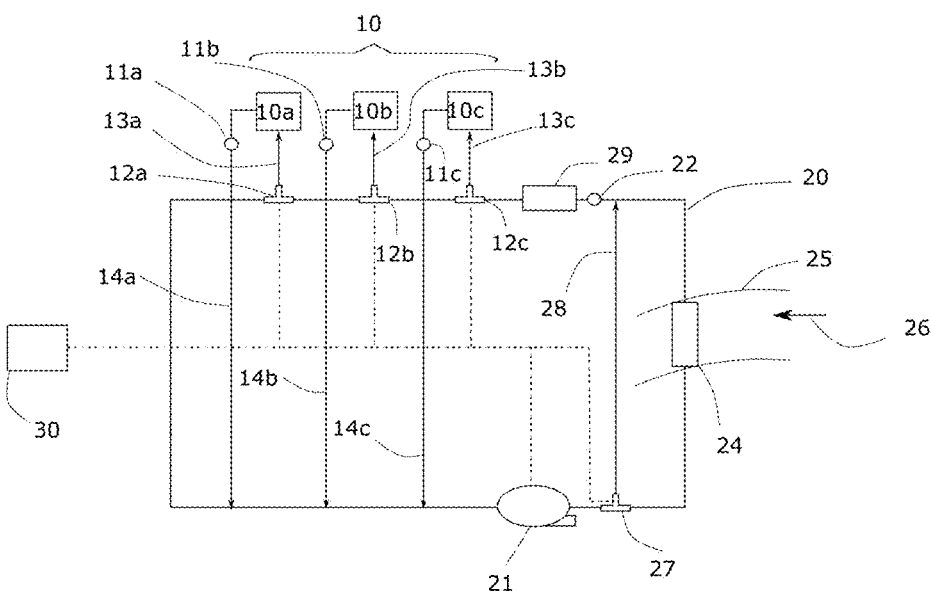
[Fig. 2]
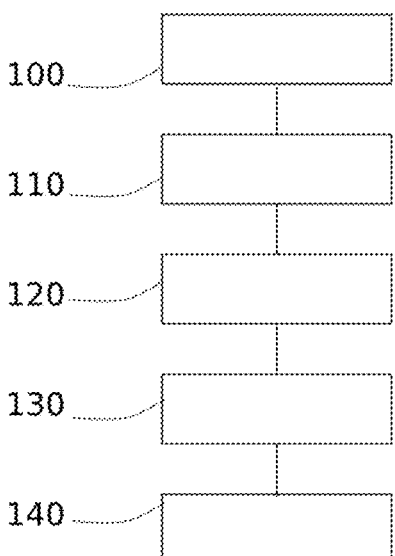

SYSTEM AND METHOD FOR COOLING A FUEL CELL ASSEMBLY

CROSS-REFERENCE TO RELATED APPLICATIONS

This application is a § 371 national phase entry of International Application No. PCT/EP2021/079573, filed Oct. 25, 2021, which claims priority to French Patent Application No. FR2010966 filed on 26 Oct. 2020.

TECHNICAL FIELD OF THE INVENTION

The invention relates to a system for cooling a fuel cell assembly intended to be mounted in a transport vehicle, in particular an air transport vehicle such as an aircraft. The invention also relates to a method for cooling a fuel cell assembly.

Technological Background

Nowadays, there is a growing trend to provide transport vehicles, in particular aircraft, with fuel cells insofar as these cells form clean, reliable and flexible energy sources.

The principle on which a fuel cell (also referred to by the acronym FC), such as a hydrogen cell, is based resides in the separation of water under the effect of an electric current (electrolysis) into dihydrogen and dioxygen. These two molecules form the chemical fuel in which energy can be stored within a fuel cell application. A second reaction ensured by the fuel cell as such allows the process to be reversed and for electricity to be produced from these two fuels.

In aeronautical applications, the described electrolysis reaction is generally effected on the ground such that hydrogen is loaded directly in a dedicated tank and the dioxygen is supplied by the air drawn in from outside the aircraft.

The fuel cell as such is thus an electric generator with two electrodes which allows the generation of electrical energy by oxidation on one electrode of a reducing fuel, such as hydrogen, coupled with a reduction on the other electrode of an oxidant, such as the oxygen from the air for example.

The redox reaction of the cell allows the generation not only of electricity but also of by-products such as water, heat and air depleted of oxygen.

It is thus necessary to provide a system for cooling the fuel cells to discharge the heat given off by the cells. In particular, it may be considered that for 1 kW of electricity produced, a fuel cell emits 1 kW of heat.

One of the solutions currently used in the aeronautical field to discharge this heat is to provide a cooling liquid circulation loop in thermal interaction with external air, of which the flow rate is set for the full power of the cell for the maximum external temperatures observed. The liquid can be circulated in the loop by a pump controlled as a function of the power of the cell to be cooled.

In the case of a fuel cell assembly in which the fuel cells are mounted in parallel or in series, it is necessary to provide a cooling system for each cell and in particular a control pump per cell, and to set the dimensions of the system as a function of the full power of the cell at the maximum power level.

This solution appears to be less than optimal, in particular when the different cells are at very different power levels from each other.

The inventors have sought to develop a system for optimized cooling of a fuel cell assembly, which overcomes at least some of the disadvantages of the known solutions.

Aims of the Invention

The invention thus aims to provide a system for cooling a fuel cell assembly which overcomes at least some of the disadvantages of the known cooling systems, in particular for on-board aeronautical applications.

The invention also aims to provide, in at least one embodiment, a cooling system which has a reduced size compared to the known systems.

The invention aims in particular to provide, in at least one embodiment, a cooling system which can be applied to a cell assembly, the cells of which each being able to provide a power level very different from each other.

The invention aims in particular to provide, in at least one embodiment, a cooling system which does not require a dedicated control pump for each cell.

The invention also aims to provide a method for cooling a fuel cell assembly.

DESCRIPTION OF THE INVENTION

To this end, the invention relates to a system for cooling a fuel cell assembly of a transport vehicle, such as an aircraft, comprising:
  a cooling fluid circulation loop, referred to as cooling loop,
  a cooling heat exchanger configured to be able to provide heat exchanges between said cooling loop and a channel for circulating cooling air drawn in from outside the transport vehicle.

The cooling system in accordance with the invention is characterized in that it further comprises, arranged on said cooling loop:
  a variable-speed pump for supplying said cooling loop with cooling fluid as a function of a measurement representative of the cooling need of said fuel cell assembly,
  for each fuel cell of said cell assembly, a 3-way valve for regulating the flow rate of cooling fluid supplying this cell as a function of a measurement representative of the cooling need of this cell.

The system in accordance with the invention thus comprises a single cooling loop supplied with cooling fluid by a single pump controlled as a function of a measurement representative of the cooling need of the cell assembly. Furthermore, each cell of the cell assembly is supplied with cooling fluid by a control valve arranged on the cooling loop and controlled as a function of a measurement representative of the cooling need of this cell.

In other words, the system in accordance with the invention combines overall control of the cell assembly as a function of a measurement of the cooling need of the cell assembly with local control of each cell as a function of the cooling need of each cell.

This particular architecture allows the use of only a single pump for supplying the cooling loop for the overall control and of one control valve per cell for the local control.

Furthermore, this architecture provided with a single pump for regulating the overall flow rate and several 3-way valves for regulating the local flow rate ensures optimized control of the cooling of a plurality of fuel cells which can provide very different power levels from each other.

In other words, the invention allows the total cooling power required for the cell assembly to be controlled, regardless of how the cells are arranged and the power they develop.

Advantageously and in accordance with the invention, the system further comprises a 3-way valve, referred to as bypass valve, arranged on said cooling loop upstream of the heat exchanger and associated with a bypass conduit of the heat exchanger so as to be able to regulate the temperature of the cooling fluid upstream of said cell assembly.

This advantageous variant allows the temperature of the cooling fluid to be regulated upstream of the cell assembly regardless of the temperature of the cooling air circulating in the cooling air circulation channel. In fact, controlling the bypass valve allows the quantity of cooling fluid in heat exchange with the cooling air to be controlled and thus the temperature of the cooling fluid to be controlled, said cooling fluid supplying the different 3-way valves controlling the different cells of the fuel cell assembly.

In other words, the cooling fluid flow rate is set by the variable-speed pump controlled by a measurement representative of the cooling need of the cell assembly and the temperature of the cooling fluid is set by the bypass valve.

The invention also allows a heating mode to be used in which at least one cell of the cell assembly heats the other cells, by controlling the 3-way valves.

Advantageously and in accordance with the invention, the system further comprises a computer for controlling said variable-speed pump, the 3-way control valve assembly and said bypass valve.

According to this variant, the computer is configured for determining the total power of the losses of the cells and for defining the necessary total flow rate of the cooling fluid in the cooling loop and the input temperature of the different cells of the cell assembly. The computer thus ensures the control of the pump, the bypass valve and the different 3-way valves respectively associated with each cell of the cell assembly.

Advantageously and in accordance with the invention, the system further comprises at least one temperature sensor arranged at the output of each fuel cell of said fuel cell assembly so as to be able to provide a temperature measurement of the cooling fluid at the cell output forming said measurement representative of the cooling need of this cell.

According to this variant, the measurement representative of the cooling need of each cell of the cell assembly is a temperature measurement at the cell output. This temperature measurement thus allows the computer to regulate the flow sent to each cell in order to maintain a target temperature.

Advantageously and in accordance with the invention, the system further comprises at least one temperature sensor arranged on the cooling loop upstream of said fuel cell assembly so as to be able to provide a temperature measurement of the cooling fluid of the cooling loop forming said measurement representative of the cooling need of said cell assembly.

According to this variant, the measurement representative of the cooling need of the cell assembly is a temperature measurement of the cooling fluid of the cooling loop upstream of said cell assembly. This temperature measurement thus allows the computer to regulate the input temperature of the cells.

The invention also relates to a method for cooling a fuel cell assembly of a transport vehicle, such as an aircraft, comprising the following steps:

circulating a cooling fluid in a loop, referred to as cooling loop, exchanging heat between said cooling fluid of said cooling loop and air drawn in from outside the transport vehicle.

The method in accordance with the invention is characterized in that it further comprises the following steps:

regulating said flow rate of cooling fluid circulating in said cooling loop as a function of a measurement representative of the cooling need of said fuel cell assembly, regulating the flow rate of cooling fluid supplying each fuel cell from said cooling loop as a function of a measurement representative of the cooling need of this cell.

The method in accordance with the invention is advantageously implemented by a system in accordance with the invention and the system in accordance with the invention advantageously implements a method in accordance with the invention. The technical effects and advantages of a system in accordance with the invention apply mutatis mutandis to a method in accordance with the invention.

Advantageously and in accordance with the invention, the method further comprises a step of regulating the temperature of said cooling fluid upstream of said fuel cell assembly by regulating the flow rate of fluid in heat exchange with said cooling air drawn in from outside the transport vehicle.

A method in accordance with this variant is advantageously implemented by a system equipped with a bypass valve in accordance with the invention. The technical effects and advantages of a system in accordance with this variant of the invention equipped with a bypass valve apply mutatis mutandis to a method in accordance with this variant of the invention.

Advantageously and in accordance with the invention, for each fuel cell of said cell assembly, said measurement representative of the cooling need of this fuel cell consists of a measurement of the temperature of the cooling fluid at the output of this cell.

A method in accordance with this variant is advantageously implemented by a system equipped with temperature sensors arranged at the output of the cells of said cell assembly. The technical effects and advantages of a system in accordance with this variant of the invention equipped with temperature sensors at the output of the cells apply mutatis mutandis to a method in accordance with this variant of the invention.

The invention also relates to a fuel cell assembly in which the fuel cells are mounted in series (same current provided by the different cells) or in parallel (same voltage provided by the different cells) or an assembly having a combination of cells mounted in series and in parallel, characterized in that it is cooled by a cooling system in accordance with the invention.

The technical effects and advantages of a cooling system in accordance with the invention apply mutatis mutandis to a fuel cell assembly in accordance with the invention.

The invention can be used for main electricity generation (power peak during start-up of some airplane loads for example) or for auxiliary power generation (supplying auxiliary systems in hot conditions for example) or for a propulsion application per se.

The invention also relates to a transport vehicle such as an aircraft, characterized in that it comprises a fuel cell assembly in accordance with the invention.

The technical effects and advantages of a system in accordance with the invention and a cell assembly in accordance with the invention apply mutatis mutandis to a transport vehicle such as an aircraft in accordance with the invention.

An aircraft in accordance with the invention may be equipped with a fuel cell assembly cooled by a cooling system in accordance with the invention for use as main electricity generation, auxiliary electricity generation or even propulsion electricity generation or a combination of these various uses.

The invention also relates to a system and a method for cooling a fuel cell assembly, to a fuel cell assembly and to a transport vehicle such as an aircraft characterized in combination by all or some of the features mentioned above or below.

LIST OF FIGURES

Other aims, features and advantages of the invention will become apparent upon reading the following description given solely in a non-limiting way and which makes reference to the following attached figures:

FIG. 1 is a schematic view of a system for cooling a fuel cell assembly in accordance with one embodiment of the invention, FIG. 2 is a schematic view of a method for cooling a fuel cell assembly in accordance with one embodiment of the invention.

DETAILED DESCRIPTION OF AN EMBODIMENT OF THE INVENTION

In the figures, for the sake of illustration and clarity, scales and proportions have not been strictly respected.

FIG. 1 schematically illustrates a system for cooling a fuel cell assembly in accordance with one embodiment of the invention.

This fuel cell assembly 10 comprises three cells 10*a*, 10*b*, 10*c* in accordance with the embodiment of the invention. Each cell 10*a*, 10*b*, 10*c* comprises in the conventional manner (not illustrated in the figures) an anode with an anode input intended to be supplied with a fuel fluid and an anode output intended to provide an anode product fluid, a cathode with a cathode input intended to be supplied with an oxidant fluid and a cathode output intended to provide a cathode product fluid.

The cooling system in accordance with the invention aims to cool the anode and/or the cathode of each cell of the fuel cell assembly. The heat exchanges between the anode and/or the cathode and the cooling fluid can be achieved by heat exchangers, heat dissipation plates placed alongside the anode and/or the cathode of each cell, such as bipolar plates, or any equivalent means. In FIG. 1, only the main elements of the cell assembly relating to the cooling system in accordance with the invention are shown.

Thus, the system comprises a cooling fluid circulation loop 20, referred to as cooling loop. This cooling loop 20 is supplied with cooling fluid, for example a heat transfer liquid, by a variable-speed pump 21.

The pump 21 thus allows the regulation of the flow rate of cooling fluid circulating in the cooling loop 20.

The variable-speed pump 21 is controlled by a computer 30 from a measurement representative of the cooling need, such as for example the measurement of the temperature of the cooling fluid provided by a sensor 22 arranged on the cooling loop 20, upstream of the cell assembly 10 and downstream of the variable-speed pump 21.

The dotted lines in FIG. 1 schematically illustrate the control signals from the computer 30 towards the pieces of equipment it controls.

The sensor 22 can be of any known type and is configured to send, to the computer 30, the temperature measurement by communication means which are not shown in the figure for the sake of clarity. The measurement can be sent to the computer by wired means, wireless means or a combination of wired and wireless means.

The sensor 22 thus provides, to the computer 30, information representative of the cooling need of the fuel cell assembly 10 and ensures that the objective in terms of temperature is actually achieved.

Furthermore, each cell 10*a*, 10*b*, 10*c* is connected to the cooling loop 20 via a conduit 13*a*, 13*b*, 13*c* and a 3-way control valve 12*a*, 12*b*, 12*c* arranged on the cooling loop 20.

Each control valve 12*a*, 12*b*, 12*c* is controlled by the computer 30 from a measurement of the temperature of the cooling fluid, said measurement supplied by a sensor 11*a*, 11*b*, 11*c* arranged at the output of the cell 10*a*, 10*b*, 10*c*, on the return conduit 14*a*, 14*b*, 14*c* towards the cooling loop 20, downstream of the cell assembly 10.

These sensors 11*a*, 11*b*, 11*c* can be of any known type and are configured to send, to the computer 30, the temperature measurement by communication means which are not shown in the figure for the sake of clarity. The measurement can be sent to the computer by wired means, wireless means or a combination of wired and wireless means.

The sensor 22 provides, to the computer, information representative of the cooling need of the cell assembly, whilst the sensors 11*a*, 11*b*, 11*c* each provide information representative of the cooling need of each cell taken individually.

In accordance with other variants, not shown, the information representative of the cooling need can be provided by means other than a temperature sensor.

This particular architecture allows the use of only a single pump for supplying the cooling loop for the overall control and of one control valve per cell for the local control.

The system in accordance with the invention also comprises a cooling heat exchanger 24 configured to provide heat exchanges between the cooling fluid circulating in the cooling loop 20 and cooling air drawn in from outside the transport vehicle and circulating in an air circulation channel 25.

The arrow 26 in FIG. 1 schematically illustrates the cooling air drawn in from outside the transport vehicle. In the case of an aircraft, this air is dynamic air, more commonly known as "RAM air" or "Rammed air", i.e. literally external air which enters into an appropriate opening of the aircraft owing to the speed of the aircraft and is conveyed to the exchanger 24 via the circulation channel 25. The circulation of air in the channel 25 can be ensured, for example, by a fan, not shown in FIG. 1. This fan can be an electric fan or a fan borne by a turbomachine shaft of the aircraft such as, for example, a turbomachine of an air conditioning system.

A flow rate regulating valve also allows the air flow rate of the system to be modulated and ensures a first temperature-control level for the sensor 22.

The heat exchanger 24 can be of any known type and is not described in detail herein.

The cooling system in accordance with the embodiment of FIG. 1 also comprises a 3-way valve, referred to as bypass valve 27, arranged on the cooling loop 20 between the pump 21 and the exchanger 24.

This control valve 27 can either supply the exchanger 24 with cooling fluid or supply a bypass conduit 28 which is arranged so as to circumvent the heat exchanger 24.

This control valve 27 is controlled by the computer 30. The combination of the control valve 27, the heat exchanger 24 and the bypass conduit 28 allows the temperature of the cooling fluid to be regulated at the input of the cells 11a, 11b, 11c, regardless of the temperature of the external air. It also allows the heating of the circuit of the heat-transfer fluid (such as an ethylene glycol water—more commonly known as the acronym EGW—mixture), for example during start-up in cold weather. Therefore, the temperature of a first cell rises and, by bypassing the main exchanger, with the common circuit, the other cells in the circuit are re-heated until the optimum usage temperature is reached.

The cooling system also comprises, in accordance with the embodiment of FIG. 1, a filter 29 configured to filter the cooling fluid. The filter 29 enables particles present in the liquid loop to be captured, which particles could pollute the cells. A deionizing filter can also be arranged on the circuit (not shown in the figures) and allows the dielectric properties of the cooling liquid to be maintained.

A system in accordance with the invention, and in particular in accordance with the embodiment of FIG. 1, allows the output temperature of each cell 10a, 10b, 10c to be precisely adjusted, regardless of the power transients of the cells and allows them to be protected against overtemperature in case of overload or operation at very high temperature.

According to one embodiment of the invention, the flow rate of the pump 21 is adjusted to the total cooling need of the assembly 10 of the cells 10a, 10b, 10c. This flow rate is regulated at constant temperature by exchange with an external air flow circulating in the channel 25.

The flow rate in each cell 10a, 10b, 10c is adjusted so as to keep the temperature constant.

The computer 30 ensures the determination of the cold power need, the flow rate control of the pump 21, the temperature regulation of each cell by the temperature measurements acquired by the sensors 11a, 11b, 11c and 22, and the control of the different valves 12a, 12b, 12c and 27 of the system.

The variable-speed pump 21 provides the total flow rate adapted to the losses of the cell assembly 10 of the system.

The temperature of the cooling fluid is regulated by discharging the calories in the exchanger 24 cooled by the external air flow 26 which allows the total losses of the cells to be discharged to the outside.

The computer 30 evaluates the total loss power of the cells and defines the necessary total flow rate and the input temperature of the cooling fluid of the cells.

The 3-way valves 12a, 12b, 12c each regulate the fluid flow rate in each cell to ensure discharge of the calories and to define the temperature at the output of the cell.

The total flow rate of the pump 21 is distributed among the cells 10a, 10b, 10c as a function of their cooling need. Each cell thus receives the minimum flow necessary to guarantee the desired internal temperature of the cell.

The invention also relates to a transport vehicle, in particular a rail-bound, automotive or airborne vehicle, equipped with a fuel cell assembly cooled by a system in accordance with the invention.

The invention also relates to a method for cooling a fuel cell assembly of a transport vehicle, such as an aircraft.

This method, schematically shown in FIG. 2, comprises the following steps:

a step 100 of circulating a cooling fluid in a cooling loop 20, a step 110 of exchanging heat between the cooling fluid circulating in the cooling loop and air 26 drawn in from outside the transport vehicle, a step 120 of regulating the flow rate of cooling fluid circulating in the cooling loop 20 as a function of a measurement representative of the cooling need of the fuel cell assembly, a step 130 (optional) of regulating the temperature of the cooling fluid upstream of the fuel cell assembly by regulating the flow rate of fluid in heat exchange with the cooling air drawn in from outside the transport vehicle, a step 140 of regulating the flow rate of cooling fluid supplying each fuel cell from the cooling loop as a function of a measurement representative of the cooling need of this cell.

The method in accordance with the invention is advantageously implemented by a system in accordance with the invention and the system in accordance with the invention advantageously implements a method in accordance with the invention.

A method and a system in accordance with the invention ensure precise temperature control of several cells connected to the same liquid loop. Furthermore, they allow the total cooling power required for the combination of cells to be controlled, regardless of how the cells are arranged and the power they develop.

A method and a system in accordance with the invention are not limited to just the embodiments described and to just the aeronautical application described. In particular, the method and the system in accordance with the invention can be applied to any type of vehicle, in particular airborne, rail-bound or automotive, and for any type of application (main generation of energy, auxiliary generation of energy or generation of propulsion energy).

The invention claimed is:

1. A system for cooling a fuel cell assembly of a transport vehicle, comprising:

a cooling fluid circulation loop, referred to as cooling loop, a cooling heat exchanger configured to be able to provide heat exchanges between said cooling loop and a channel for circulating cooling air drawn in from outside the transport vehicle, a variable-speed pump for supplying said cooling loop with cooling fluid as a function of a measurement representative of the cooling need of said fuel cell assembly, for each corresponding one of the fuel cells of said fuel cell assembly, a 3-way valve for regulating the flow rate of cooling fluid supplying this the corresponding one of the fuel cells as a function of a measurement representative of the cooling need of the corresponding one of the fuel cells.

2. The system as claimed in claim 1, wherein the system further comprises a 3-way valve, referred to as bypass valve, arranged on said cooling loop upstream of the heat exchanger and associated with a bypass conduit of the heat exchanger so as to be able to regulate the temperature of the cooling fluid upstream of said cell assembly.

3. The system as claimed in claim 2, wherein the system further comprises a computer for controlling said variable-speed pump, each 3-way valve and said bypass valve.

4. The system as claimed in claim 1, wherein the system further comprises at least one temperature sensor arranged at the output of each fuel cell of said fuel cell assembly so as to be able to provide a temperature measurement of the cooling fluid at the cell output forming said measurement representative of the cooling need of the corresponding one of the fuel cells.

5. The system as claimed in claim 1, wherein the system further comprises at least one temperature sensor arranged on the cooling loop upstream of said fuel cell assembly so as to be able to provide a temperature measurement of the cooling fluid of the cooling loop forming said measurement representative of the cooling need of said cell assembly.

6. A method for cooling a fuel cell assembly of a transport vehicle, the fuel cell assembly comprising a plurality of fuel cells the method comprising:

circulating a cooling fluid in a loop, referred to as cooling loop, providing—heat exchanges between said cooling fluid of said cooling loop and air drawn in from outside the transport vehicle, wherein said method further comprises:

regulating said flow rate of cooling fluid circulating in said cooling loop as a function of a measurement representative of the cooling need of said fuel cell assembly, regulating the flow rate of cooling fluid supplying each fuel cell of the fuel cell assembly from said cooling loop as a function of a measurement representative of the cooling need of this fuel cell.

7. The method as claimed in claim 6, wherein the method further comprises a step of regulating the temperature of said cooling fluid upstream of said fuel cell assembly by regulating the flow rate of fluid in heat exchange with said cooling air drawn in from outside the transport vehicle.

8. The method for cooling as claimed in claim 6, wherein, for each fuel cell of said cell assembly, said measurement representative of the cooling need of this fuel cell consists of a measurement of the temperature of the cooling fluid at the output of this fuel cell.

9. A transport vehicle comprising a fuel cell assembly comprising a plurality of fuel cells, wherein the vehicle further comprises a system for cooling said fuel cell assembly comprising:

a cooling fluid circulation loop, referred to as cooling loop, a cooling heat exchanger configured to be able to provide heat exchanges between said cooling loop and a channel for circulating cooling air drawn in from outside the transport vehicle, a variable-speed pump for supplying said cooling loop with cooling fluid as a function of a measurement representative of the cooling need of said fuel cell assembly, for each corresponding one of the fuel cells of said cell assembly, a 3-way valve for regulating the flow rate of cooling fluid supplying this the corresponding one of the fuel cells as a function of a measurement representative of the cooling need of the corresponding one of the fuel cells.

\* \* \* \* \*